J. C. SMITH.
BISCUIT CUTTER.
APPLICATION FILED JUNE 14, 1918.

1,299,802.

Patented Apr. 8, 1919.
2 SHEETS—SHEET 1.

Inventor
J. C. Smith

By _____
Attorney

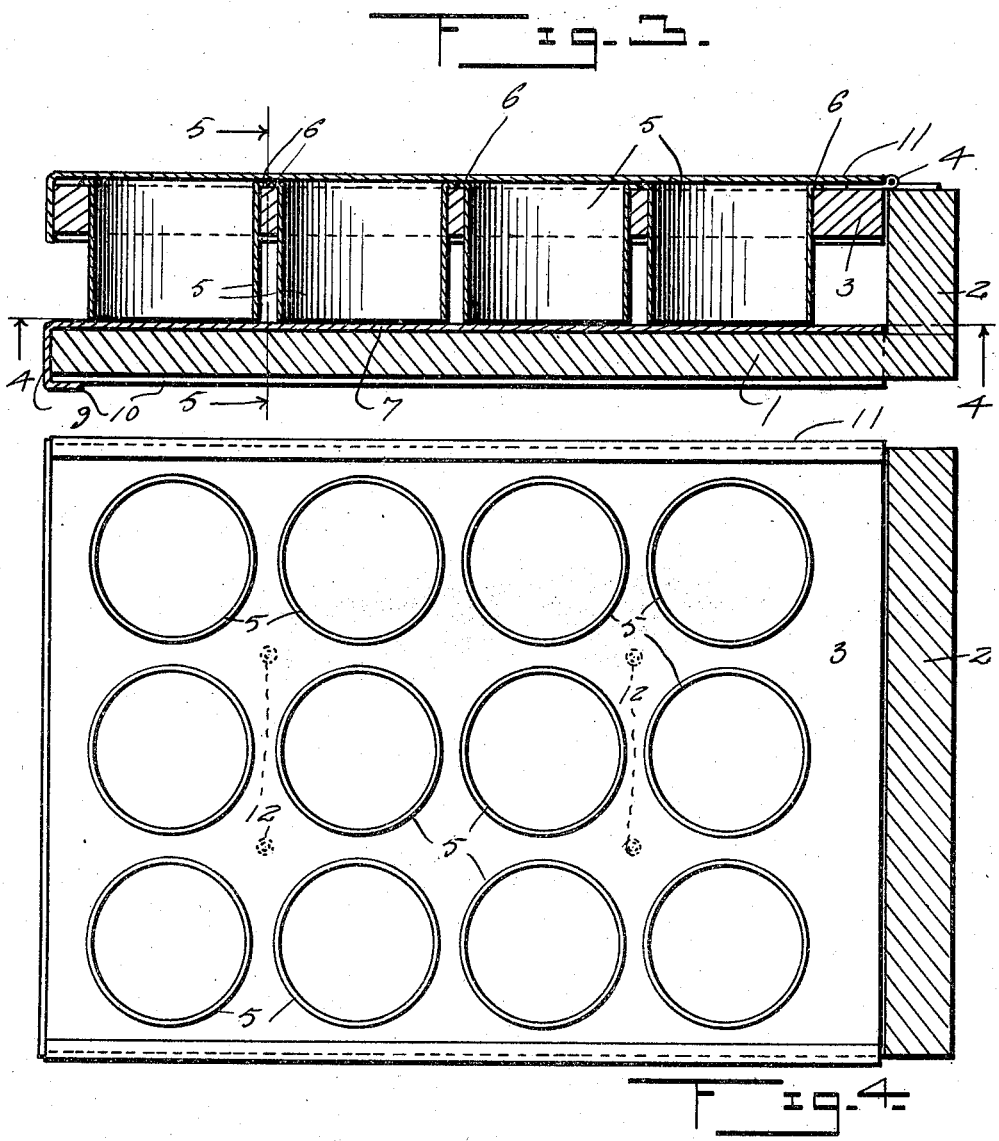

UNITED STATES PATENT OFFICE.

JOHN C. SMITH, OF SULLIVAN, WEST VIRGINIA.

BISCUIT-CUTTER.

1,299,802.     Specification of Letters Patent.     Patented Apr. 8, 1919.

Application filed June 14, 1918. Serial No. 239,982.

*To all whom it may concern:*

Be it known that I, JOHN C. SMITH, a citizen of the United States, residing at Sullivan, in the county of Raleigh and State of West Virginia, have invented certain new and useful Improvements in Biscuit-Cutters; and I do hereby declare the following to be a full, clear, and exact description of the invention, such as will enable others skilled in the art to which it appertains to make and use the same.

This invention relates to improvements in biscuit cutters of the character including a base having a hinged cutter supporting member provided with cylindrical cutters, and has for one of its objects the provision of means for detachably securing the cutters to the supporting member, so that the cutters can be removed and readily cleansed, and which will also form a complete closure to the outer end of the cutter while in use.

Another object of this invention is provision of a removable cover to the base which will present an even and hard surface for the cutters to engage when cutting dough, and which can be readily removed when desiring to wash or clean the device.

A further object of this invention is the provision of a biscuit cutter of the above stated character, which will be simple, durable and efficient and which may be manufactured and sold at a comparatively low cost.

With these and other objects in view, as will become more apparent as the description proceeds, the invention consists in certain novel features of construction, combination and arrangement of parts as will be hereinafter more fully described and claimed.

Figure 1:
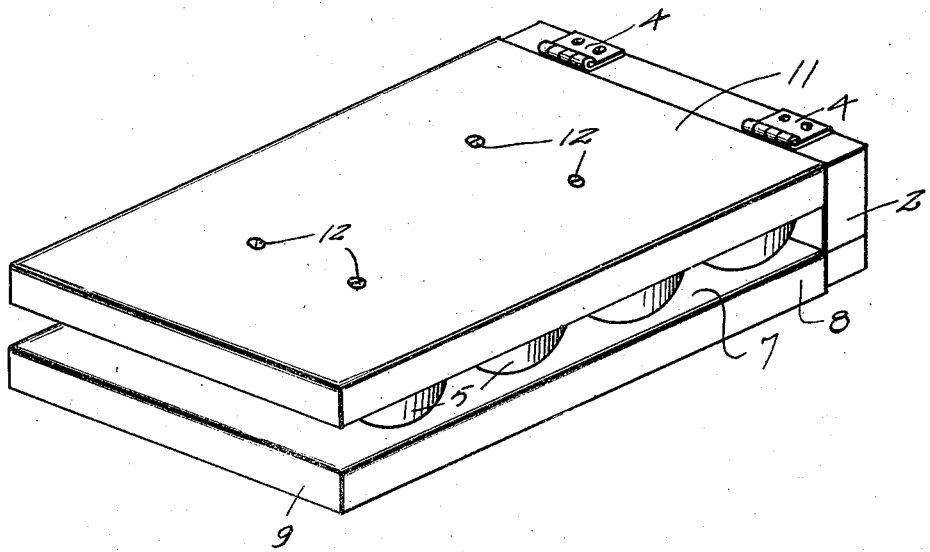
Figure 2:
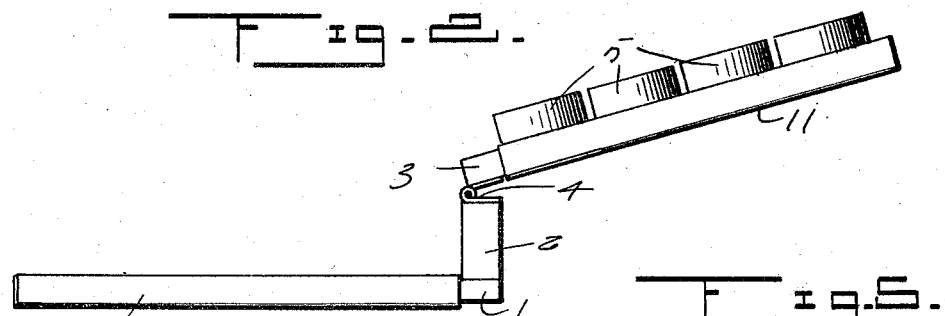
Figure 3:
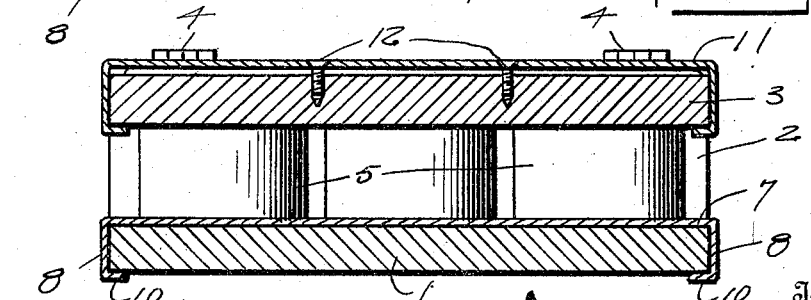

For a complete understanding of my invention, reference will be had to the following description and accompanying drawings, in which:

Figure 1 is a perspective view of a biscuit cutter constructed in accordance with my invention, Fig. 2 is a side elevation of the same, illustrating the cutters in an open or inoperative position, Fig. 3 is a vertical sectional view, illustrating the manner of mounting the cutters in the cutter supporting member, Fig. 4 is a longitudinal sectional view, taken on the line 4—4 of Fig. 3, Fig. 5 is a transverse sectional view, taken on the line 5—5 of Fig. 3, and Fig. 6 is a perspective view of one of the cutters.

Referring in detail to the drawings, the numeral 1 indicates a base constructed of wood, or any other material suitable for the purpose, and has secured to one end a transversely extending member 2. A cutter supporting member or board 3 has one end secured to the upper edge of the member 2 by hinges 4, so that the cutter supporting member or board 3 may be swung to overlie the base 1 in spaced relation thereto, and is provided with a plurality of openings to receive cylindrical cutters 5. Flanges 6 are formed upon the outer ends of the cutters 5 and overlie the outer face of the supporting member or board 3, supporting the cutters within the openings. When the cutter supporting member or board 3 is swung to overlie the base 1, the inner edges of the cutters 5 engage the upper face of the base 1.

A cover 7 overlies the base 1 and has formed thereon side walls 8 and one end wall 9, which overlie the edges of the base 1. Inwardly directed flanges 10 are formed upon the side and end walls 8 and 9 and underlie the base, so as to firmly retain the cover 7 upon the base, providing an even and hard surface for the cutters to engage. The cover 7 can be readily removed from the base when desiring to clean the device. The cover 7 is preferably constructed of sheet metal, but may be made of any other material suitable for the purpose.

A second cover 11, identical in construction with the cover 7, is positioned upon the supporting member or board 3 by sliding the same on said member or board from the free end in the direction of its hinged end. When the cover 11 is positioned upon the supporting member or board 3, it closes the outer ends of the cutters and prevents the cutters from moving outwardly of the openings, and which cutters are prevented from moving inwardly by the flanges 6. Thus it will be seen that the cutters are firmly held in position within their respective openings of the board or member 3. The cover 11 is secured to the supporting member or board 3 by set screws 12, which engage in the board or member 3 and provide a construction wherein the cover is firmly secured in position, but permit of the cover being removed by removing the set screws 12.

From the foregoing description, taken in connection with the accompanying drawings, it will be noted that means have been provided for firmly securing the cutters to the cutter supporting members or boards, and which will permit of removal of the cutters when desiring to clean the same and also the entire device. It is further to be noted that a substantial and hard surface has been provided for the base and which the cutters are to engage to cut the dough positioned upon the base into biscuits.

While I have shown and described the preferred embodiment of my invention, it will be understood that minor changes in construction, combination and arrangement of parts may be made without departing from the spirit and scope of the invention as claimed.

Having thus described my invention, what I claim, is:

1. A biscuit cutter including a base and a hinged cutter-supporting member having openings, cutters located in said openings, flanges formed on said cutters and overlying the supporting member, and a cover on the cutter-supporting member closing the outer ends of the cutters and coöperating with the flanges in retaining the cutters within the openings.

2. A biscuit cutter including a base and a hinged cutter-supporting member having openings, cutters within said openings, flanges on said cutters and resting upon the supporting member, a cover slidable upon said supporting member and closing the outer ends of the cutters and coöperating with the flanges in retaining the cutters in the openings, and means detachably securing the cover to the supporting member.

In testimony whereof I affix my signature in presence of two witnesses.

JOHN X C. SMITH.
his mark

Witnesses:
W. H. KESTER, Jr.,
W. I. SMITH.

Copies of this patent may be obtained for five cents each, by addressing the "Commissioner of Patents, Washington, D. C."